2,961,269
BEAM CLAMP

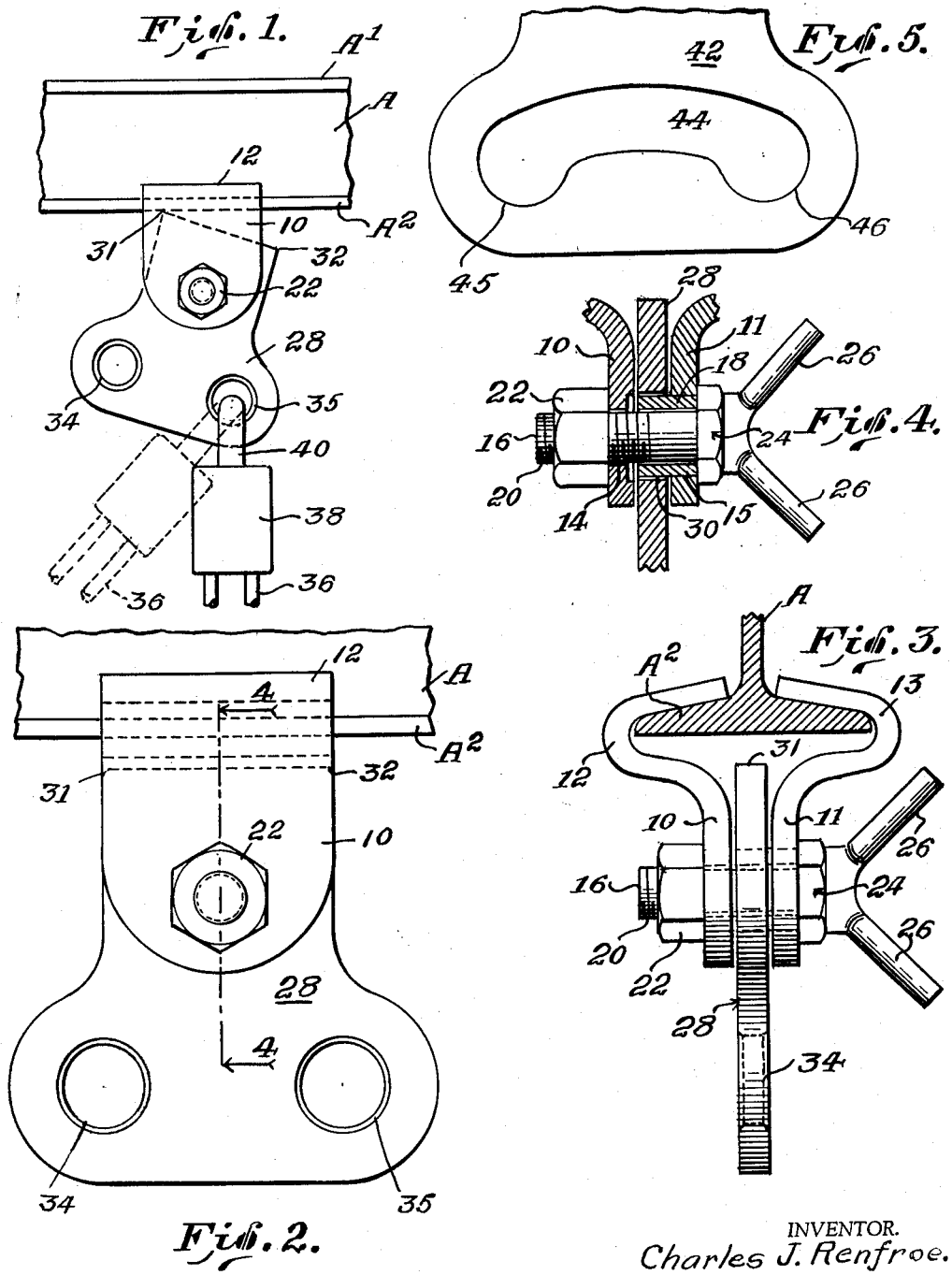

Charles Joseph Renfroe, P.O. Box 4279, Jacksonville, Fla.

Filed Aug. 21, 1957, Ser. No. 679,350

8 Claims. (Cl. 294—85)

This invention relates to improvements in beam clamps and the like and relates more particularly to a self-locking beam clamp which may be used in ship yards, aboard ship, in industrial plants and in other places. The clamp of this invention is particularly adapted for clamping the same to the flanges of an overhead beam and for supporting chain falls, hoists, chain blocks and other lifting appurtenances, whereby loads may be safely lifted and moved from place to place and locked after their movement from one place to another.

An object of the invention is to provide an automatic locking beam clamp which will lock the clamp to a beam when the load is applied by suitable attaching means to the beam.

Another object is the provision of a double lock for holding the clamp in fixed position on a beam.

A further object is to provide means for locking a clamp to a beam whether the load is applied in a vertical direction or at an angle thereto on either side of a vertical line passing through the center of the clamp.

An additional object is to provide a beam clamp lock which will unlock the clamp from the beam when the load is removed.

Yet another object is to provide a beam clamp which is entirely efficient and safe under all operating conditions.

A further object is to provide a beam clamp which may be used to transport objects and for locking the same in place on a structural beam, the said clamp being adapted, when desired, for lifting and moving single beams from place to place on a construction job or at other places.

Other objects will appear hereinafter throughout the specification.

In the drawings:

Figure 1 is a side elevation of the beam lock showing the load applied in a vertical direction in full lines and at an angle thereto in dotted lines;

Figure 2 is an enlarged side elevation showing the beam clamp in unlocked position for movement from place to place along the length of the beam;

Figure 3 is an end elevation of the beam clamp with the beam shown in broken away section, the clamp being shown in unlocked position;

Figure 4 is a vertical section partly broken away but showing a pivot bolt in full lines and taken on the line 4—4 of Figure 2; and Figure 5 is a side elevation of a modified form of the clamping plate, partly broken away.

It is very often necessary to move heavy loads within confined spaces, such as within the hull of a submarine. In other installations a greater amount of space is allowed. However, in all installations where heavy loads are moved along the length of a beam, means must be provided for positively locking the load to the beam under all operating conditions, whether the load is applied in a vertical direction or at an inclined angle with regard to a vertical direction. Otherwise, if the load is allowed to shift along the length of the beam, injuries to workmen to one side of or below the load will occur.

The clamp of the present invention provides two locking means in a single clamp, each locking the clamping parts and the load supported thereby in fixed position on the beam. One of these clamps consists of a pivot member with teeth which is lockable to cause the teeth to engage the under side of the flange when the load is applied to the beam clamp. The other locking means is independent of the first named locking means and it consists of a screw clamp member which causes the body members on either side of the locking plate to positively engage the sides of the plate to thereby hold the teeth in engagement with the under side of the beam, even when the load is removed from the beam clamp.

Referring now to the drawings, A shows an I-beam structure having upper flanges $A^1$ and lower flanges $A^2$.

The beam clamp comprises a pair of body portions 10 and 11, each of which, as shown in Figure 3, is provided with U-shaped clamping portions 12 and 13. These may be slid along the length of the I-beam until the load is applied as hereinafter described. Each body portion 10 and 11 is provided with apertures 14 and 15 adjacent the opposite ends thereof from said U-shaped clamping portions.

Extending through the apertures 14 and 15 is a pivot bolt 16, and surrounding this bolt is a bearing sleeve 18. The bolt may be provided with threads 20 for the reception of a nut 22, and on the opposite end of the bolt is located a multi-sided head 24. The nut and head may be rotated relative to each other by means of suitable tools, and the bolt may be separately rotated by means of the handles 26, thus making it unnecessary to use a wrench on the head 24.

A shackle plate 28 is provided with an aperture 30 for the reception of the bearing sleeve 18, to thereby permit the plate to rotate on the bearing sleeve. The plate is provided with teeth 31 and 32, as shown in Figure 1, and located on the opposite side of the opening 30 from said teeth are a plurality of offset openings 34 and 35. The load may be applied by any suitable means, such as that shown in Figure 1, this means including a chain fall 36, a carrier 38, and a link or hook 40. The load may be applied to either of the eyes 34 or 35. If the direction of pull is that shown in dotted lines in Figure 1, the offset opening 35 should be used, whereas if the load is to be applied at an angle to the right of the pivot 16, offset opening 34 should be used for suspension purposes.

When the load is applied, the shackle plate 28 will rotate on the bearing sleeve about pivot bolt 16 until one of the teeth 31 or 32, depending upon which side of the pivot the load is applied, bite into the under side of the I-beam A. When this occurs, the bolt may be tightened by rotation of the nut 22 on the threads 20, or the nut can be held stationary while the head 24 is engaged with the wrench and rotated, or the handles 26 are rotated by hand to cause the body portions of the beam clamp to positively engage the side walls of the shackle plate 28. Thus a double locking action is applied to prevent any possible sliding movement between the beam clamp along the flanges of the beam.

It will be understood that this clamp has particular application where the load may shift. Assuming that the beam is located on a ship below deck, and the ship is being subjected to the action of a heavy sea, the teeth 31 or 32 may tend to become disengaged from the I-beam during rocking movements of the ship. However with the secondary lock in operation, the shackle plate can not move relative to the body portions during this time and the tooth remains firmly locked to the under side of the beam.

Referring to Figure 5, which shows a second form of the invention, instead of providing the offset openings 34 and 35 a slightly different form of construction of the shackle plate is shown. The remainder of the construction of the shackle plate is identical with that shown in Figures 1 to 4. In the Figure 5 modified form of the invention, the shackle plate is indicated at 42, and in place of the openings 34 and 35 there has been provided an arcuate slot 44. The opposite ends of the arcuate slot are provided with enlarged openings 45 and 46.

This construction allows for a quick change from one side to the other of the plate 42. As indicated above, this plate may be substituted for the plate 28, shown in Figures 1 to 4, inclusive.

It will be understood that the present invention, while it is adapted to move along a stationary beam to lock a load in position on said beam, may be used for moving a beam from place to place. This may be accomplished by attaching the shackle to a beam and lifting the beam with the aid of a clamp, hoist, chain block or the like. As soon as the lifting operation starts, the clamp will automatically lock itself to the beam as the load is applied. In other words, the invention is adapted to use the beam as the load, in place of supporting a load beneath the stationary beam, forming part of a load transportation system in shipyards, aboard ships, or industrial plants.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A self-locking beam clamp comprising a pair of body portions, at least one of said body portions having a U-shaped clamping portion for embracing a flange of a structural beam, the other body portion having means for engaging said beam whereby the beam is engaged on opposite sides by said body portions, the said U-shaped clamping portion adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, said shackle plate having an upper surface located below said U-shaped clamping portion of said body portions and below said beam, said upper surface having teeth means adapted to engage said beam upon rotation of said shackle plate on said pivot means, load attaching means on said shackle plate laterally offset from a line extending substantially medially and longitudinally of said pivot means whereby upon application of a load to said load attaching means said shackle plate teeth means engages the under side of said beam, and means including said pivot means for clampingly engaging said body portions with the sides of said shackle plate.

2. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means on said shackle plate adapted to engage said beam upon rotation of said shackle plate on said pivot means, load attaching means on said shackle plate laterally offset from a line extending substantially medially and longitudinally of said pivot means whereby upon application of a load to said load attaching means said shackle plate teeth means engages the under side of said beam, means including said pivot means for clampingly engaging said body portions with the sides of said shackle plate, and a bearing sleeve surrounding said pivot means whereby to rotatably support said shackle plate.

3. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means on said shackle plate adapted to engage said beam upon rotation of said shackle plate on said pivot means, load attaching means on said shackle plate laterally offset from a line extending substantially medially and longitudinally of said pivot means whereby upon application of a load to said load attaching means said shackle plate teeth means engage the under side of said beam, and means including said pivot means for clampingly engaging said body portions with said shackle plate, said load attaching means comprising at least one aperture extending through said shackle plate.

4. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means no said shackle plate adapted to engage said beam upon rotation of said shackle plate on said pivot means, load attaching means on said shackle plate, said load attaching means being located on the opposite side of said pivot from said teeth means and comprising an arcuate slot having enlarged openings forming the ends of said slot, and means including said pivot means for clampingly engaging said body portions with the side portions of said shackle plate.

5. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means on said shackle plate adapted to engage a beam upon rotation of said shackle plate on said pivot means, load attaching means on said shackle plate laterally offset from a line extending substantially medially and longitudinally of said pivot means whereby upon application of a load to said load attaching means said shackle plate teeth means engages the under side of said beam, and means including said pivot means for clampingly engaging said body portions with the sides of said shackle plate, said pivot means including a bolt having threads on one end, a nut on said threads, and means on the opposite side of said bolt for rotating the same.

6. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means on said shackle plate adapted to engage said beam upon rotation of said shackle plate on said pivot means, load attaching means on said shackle plate laterally offset from a line extending substantially medially and longitudinally of said pivot means whereby upon application of a load to said load attaching means said shackle plate teeth means engages the under side of said beam, means including said pivot means for clampingly engaging said body portions with the sides of said shackle plate, and a bearing sleeve surrounding said pivot means whereby to rotatably support said shackle plate, said pivot means including a bolt having threads on one end, a nut on said threads, and means on the opposite side of said bolt for rotating the same.

7. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means on said shackle plate adapted to engage said beam upon rotation of said shackle plate on said pivot means, load attaching means on said shackle plate laterally offset from a line extending substantially medially and longitudinally of said pivot means whereby upon application of a load to said load attaching means said shackle plate teeth means engages the under side of said beam, and means including said pivot means for clampingly engaging said body portions with the sides of said shackle plate, said pivot means including a bolt having threads on one end, a nut on said threads, and means on the opposite side of said bolt for rotating the same, said last named means comprising handle portions rigidly mounted on said bolt.

8. A self-locking beam clamp comprising a pair of body portions, each having a U-shaped clamping portion at one end thereof adapted for embracing the opposite flanges of a structural beam, the said U-shaped clamping portions adapted to extend longitudinally along the flanges of said beam, each body portion having a pivot receiving opening adjacent the opposite end from said U-shaped clamping portion, a shackle plate having sides located between said body portions and having a pivot receiving opening, pivot means extending through the pivot receiving openings of said body portions and shackle plate, teeth means on said shackle plate adapted to engage said beam upon rotation of said shackle plate on said pivot means, load attaching means on said shackle plate laterally offset from a line extending substantially medially and longitudinally of said pivot means whereby upon application of a load to said load attaching means said shackle plate teeth means engages the under side of said beam, means including said pivot means for clampingly engaging said body portions with the sides of said shackle plate, a bearing sleeve surrounding said pivot means whereby to rotatably support said shackle plate, said pivot means including a bolt having threads on one end, a nut on said threads, and means on the opposite side of said bolt for rotating the same, said last named means comprising handle portions rigidly mounted on said bolt.

References Cited in the file of this patent

UNITED STATES PATENTS

| | | |
|---|---|---|
| 368,408 | McCoy | Aug. 16, 1887 |
| 862,840 | Nelson et al. | Aug. 6, 1907 |
| 1,729,330 | Dart | Sept. 24, 1929 |
| 1,959,722 | Lackner | May 22, 1934 |
| 2,568,263 | Wiseman | Sept. 18, 1951 |
| 2,671,625 | Buckley | Mar. 9, 1954 |

FOREIGN PATENTS

| | | |
|---|---|---|
| 403,013 | Italy | Apr. 1, 1943 |
| 841,894 | Germany | June 19, 1952 |